United States Patent
Zhu et al.

(10) Patent No.: US 11,540,182 B2
(45) Date of Patent: Dec. 27, 2022

(54) ABSOLUTE RADIO FREQUENCY CHANNEL NUMBER FOR SECURITY KEY GENERATION

(71) Applicant: QUALCOMM Incorporated, San Diego, CA (US)

(72) Inventors: Xipeng Zhu, San Diego, CA (US); Soo Bum Lee, San Diego, CA (US); Ravi Agarwal, San Diego, CA (US); Luis Fernando Brisson Lopes, Swindon (GB); Ozcan Ozturk, San Diego, CA (US); Masato Kitazoe, Tokyo (JP); Linhai He, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 52 days.

(21) Appl. No.: 17/038,665

(22) Filed: Sep. 30, 2020

(65) Prior Publication Data
US 2021/0099922 A1 Apr. 1, 2021

Related U.S. Application Data

(60) Provisional application No. 62/908,941, filed on Oct. 1, 2019.

(51) Int. Cl.
*H04W 36/00* (2009.01)
*H04W 36/38* (2009.01)
*H04W 12/041* (2021.01)

(52) U.S. Cl.
CPC ..... *H04W 36/0038* (2013.01); *H04W 12/041* (2021.01); *H04W 36/38* (2013.01)

(58) Field of Classification Search
CPC .......... H04W 12/041; H04W 36/0038; H04W 36/38
See application file for complete search history.

(56) References Cited

U.S. PATENT DOCUMENTS

2021/0176692 A1* 6/2021 Rugeland .............. H04W 48/20
2021/0314785 A1* 10/2021 Raghavan ............. H04W 16/28

OTHER PUBLICATIONS

Huawei, et al., "On the ARFCN-DL Used for Security Input in NR," 3GPP Draft, 3GPP TSG-RAN WG2 Meeting #101bis, R2-1805531, 3rd Generation Partnership Project (3GPP), Mobile Competence Centre, 650, Route Des Lucioles, F-06921, Sophia-Antipolis Cedex, France, vol. Ran WG2. No. Sanya, China, Apr. 16, 2018-Apr. 20, 2018, Apr. 6, 2018 (Apr. 6, 2018), XP051416002, 2 pages, Retrieved from the Internet: URL: http://www.3gpp.org/ftp/tsg%5Fran/WG2%5FRL2/TSGR2%5F101bis/Docs/ [retrieved on Apr. 6, 2018] section 2.

(Continued)

*Primary Examiner* — Jianye Wu
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may identify a frequency associated with a synchronization signal block (SSB) associated with a base station. The UE may generate a security key associated with a handover of the UE based at least in part on the frequency associated with the SSB. Numerous other aspects are provided.

35 Claims, 10 Drawing Sheets

(56) References Cited

OTHER PUBLICATIONS

International Search Report and Written Opinion—PCT/US2020/070603—ISA/EPO—Dec. 22, 2020.
Mediatek Inc: "TP to 38.300 on Cell-Defining SSB", 3GPP TSG RAN WG2 Meeting #101bis, 3GPP Draft, R2-1804610, 3rd Generation Partnership Project (3GPP), Mobile Competence Centre, 650, Route Des Lucioles, F-06921, Sophia-Antipolis Cedex, France, vol. Ran WG2, No. Sanya, China; Apr. 16, 2018-Apr. 20, 2018, Apr. 14, 2018 (Apr. 14, 2018), 4 Pages, XP051428328, Retrieved from the Internet: URL: http://www.3gpp.org/ftp/Meetings%5F3GPP%5FSYNC/RAN2/Docs/ [retrieved on Apr. 14, 2018], Chapter 2.2 CD-SSB in IDLE/INACTIVE, section 2.1.
OPPO: "Left Issues for Inactive Security Framework," 3GPP Draft, 3GPP TSG-RAN2#101bis, R2-1804551—Left Issues for Inactive Security Framework, 3rd Generation Partnership Project (3GPP), Mobile Competence Centre, 650, Route Des Lucioles, F-06921, Sophia-Antipolis Cedex, France, vol. RAN WG2. No. Sanya. P. R. China, Apr. 16, 2018-Apr. 20, 2018, Apr. 14, 2018 (Apr. 14, 2018), XP051428277, pp. 1-8, Retrieved from the Internet: URL: http://www.3gpp.org/ftp/Meetings%5F3GPP%5FSYNC/RAN2/Docs/ [retrieved on Apr. 14, 2018] section 2.2.
Qualcomm Incorporated: "ARFCN for Security Key Derivation," 3GPP Draft, 3GPP TSG-RAN WG2 Meeting#107bis, R2-1913394, 3rd Generation Partnership Project (3GPP), Mobile Competence Centre, 650, Route Des Lucioles, F-06921, Sophia-Antipolis Cedex, France, vol. Ran WG2, No. Chongqing. China, Sep. 14, 2019-Sep. 18, 2019, Oct. 4, 2019 (Oct. 4, 2019), XP051804973, 4 pages, Retrieved from the Internet: URL: https://ftp.3gpp.org/tsg_ran/WG2_RL2/TSGR2_107bis/Docs [retrieved on Oct. 4, 2019] section 3.
ETSI TS 138 423 V15.0.0 (Jul. 2018), 5G; NG-RAN, Xn Application Protocol (XnAP) (3GPP TS 38.423 version 15.0.0 Release 15), 189 pages.

\* cited by examiner

ABSOLUTE RADIO FREQUENCY CHANNEL NUMBER FOR SECURITY KEY GENERATION

CROSS-REFERENCE TO RELATED APPLICATION

This Patent Application claims priority to U.S. Provisional Patent Application No. 62/908,941, filed on Oct. 1, 2019, entitled "ABSOLUTE RADIO FREQUENCY CHANNEL NUMBER FOR SECURITY KEY GENERATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for identifying an absolute radio frequency channel number for security key generation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include identifying a frequency associated with a synchronization signal block (SSB) associated with a base station (BS); and generating a security key associated with a handover of the UE based at least in part on the frequency associated with the SSB.

In some aspects, a method of wireless communication, performed by a BS, may include transmitting, to a UE, a handover command that identifies a plurality of frequencies; and generating a security key, associated with a handover of the UE, based at least in part on a frequency of the plurality of frequencies, wherein the frequency is associated with an SSB associated with the BS.

In some aspects, a method of wireless communication, performed by a BS, may include identifying a frequency associated with an SSB associated with a UE; and transmitting, to another BS, a communication that identifies the frequency associated with the SSB, wherein the frequency associated with the SSB is included in a plurality of frequencies identified in the communication, and wherein the frequency associated with the SSB is identified, in the communication, as an absolute radio frequency channel number (ARFCN) for purposes of generating a security key associated with the UE.

In some aspects, a UE for wireless communication may include a memory and one or more processors operatively coupled to the memory, the memory and the one or more processors configured to identify a frequency associated with an SSB associated with the BS; and generate a security key associated with a handover of the UE based at least in part on the frequency associated with the SSB.

In some aspects, a BS for wireless communication may include a memory and one or more processors operatively coupled to the memory, the memory and the one or more processors configured to transmit, to a UE, a handover command that identifies a plurality of frequencies; and generate a security key, associated with a handover of the UE, based at least in part on a frequency of the plurality of frequencies, wherein the frequency is associated with an SSB associated with the BS.

In some aspects, a BS for wireless communication may include a memory and one or more processors operatively coupled to the memory, the memory and the one or more processors configured to identify a frequency associated with an SSB associated with a UE; and transmit, to another BS, a communication that identifies the frequency associated with the SSB, wherein the frequency associated with the SSB is included in a plurality of frequencies identified in the communication, and wherein the frequency associated with the SSB is identified, in the communication, as an ARFCN for purposes of generating a security key associated with the UE.

In some aspects, a non-transitory computer-readable medium may store one or more instructions for wireless communication, the one or more instructions comprising one or more instructions that, when executed by one or more processors of a UE, cause the one or more processors to identify a frequency associated with an SSB associated with the BS; and generate a security key associated with a handover of the UE based at least in part on the frequency associated with the SSB.

In some aspects, a non-transitory computer-readable medium may store one or more instructions for wireless communication, the one or more instructions comprising one or more instructions that, when executed by one or more processors of a BS, cause the one or more processors to transmit, to a UE, a handover command that identifies a plurality of frequencies; and generate a security key, associated with a handover of the UE, based at least in part on a frequency of the plurality of frequencies, wherein the frequency is associated with an SSB associated with the BS.

In some aspects, a non-transitory computer-readable medium may store one or more instructions for wireless communication, the one or more instructions comprising one or more instructions that, when executed by one or more processors of a BS, cause the one or more processors to identify a frequency associated with an SSB associated with a UE; and transmit, to another BS, a communication that identifies the frequency associated with the SSB, wherein the frequency associated with the SSB is included in a plurality of frequencies identified in the communication, and wherein the frequency associated with the SSB is identified, in the communication, as an ARFCN for purposes of generating a security key associated with the UE.

In some aspects, an apparatus for wireless communication may include means for identifying a frequency associated with an SSB associated with the BS; and means for generating a security key associated with a handover of the apparatus based at least in part on the frequency associated with the SSB.

In some aspects, an apparatus for wireless communication may include means for transmitting, to a UE, a handover command that identifies a plurality of frequencies; and means for generating a security key, associated with a handover of the UE, based at least in part on a frequency of the plurality of frequencies, wherein the frequency is associated with an SSB associated with apparatus.

In some aspects, an apparatus for wireless communication may include means for identifying a frequency associated with an SSB associated with a UE; and means for transmitting, to another apparatus, a communication that identifies the frequency associated with the SSB, wherein the frequency associated with the SSB is included in a plurality of frequencies identified in the communication, and wherein the frequency associated with the SSB is identified, in the communication, as an ARFCN for purposes of generating a security key associated with the UE.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
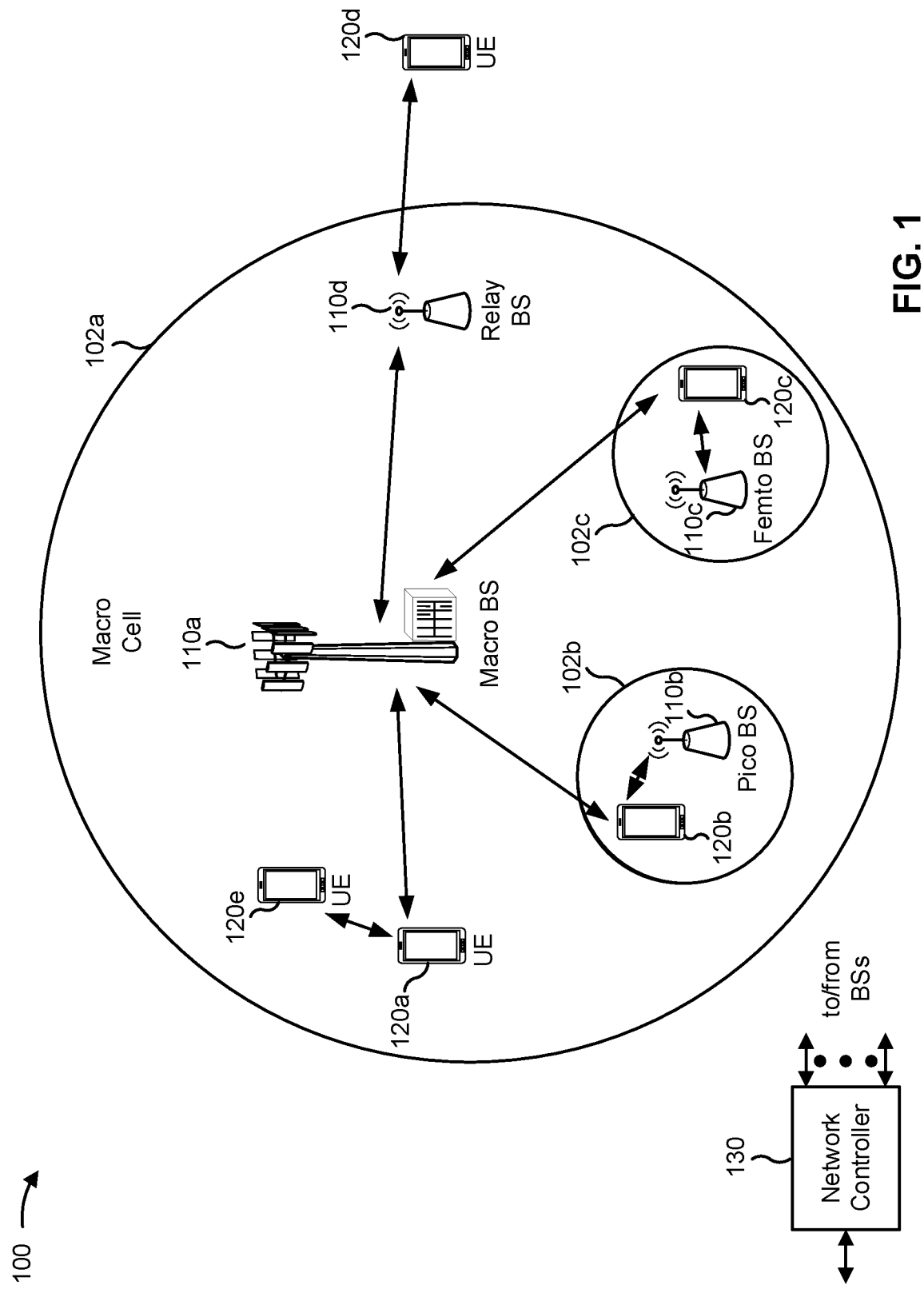
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
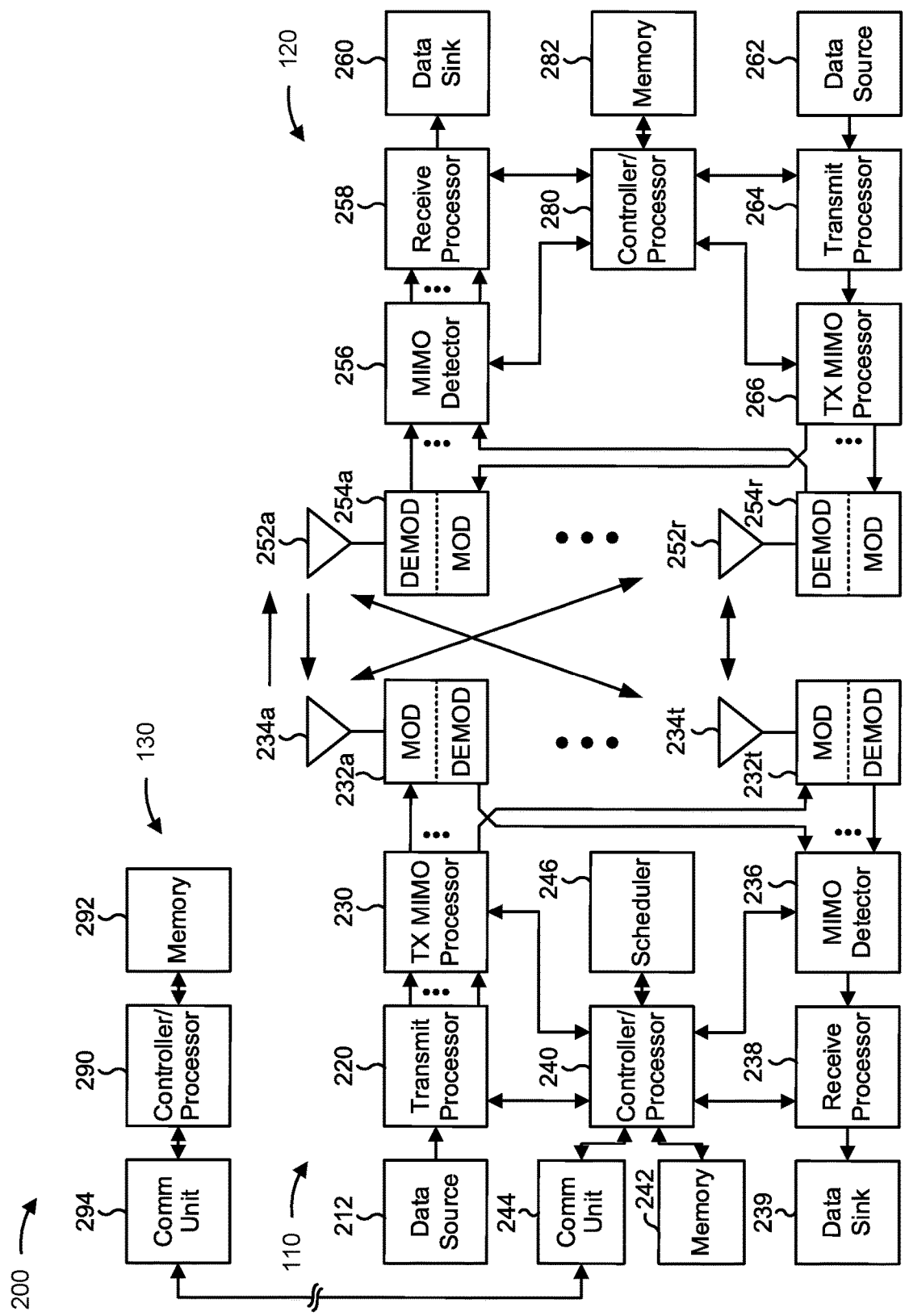
FIG. 2 is a block diagram conceptually illustrating an example of a base station (BS) in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with identifying an absolute radio frequency channel number (ARFCN) for security key generation, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, process 600 of FIG. 6, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 400 of FIG. 4, process 500 of FIG. 5, process 600 of FIG. 6, and/or other processes as described herein. A scheduler 246 may schedule UEs for data transmission on the downlink and/or uplink.

In some aspects, UE 120 may include means for identifying a frequency associated with a synchronization signal block (SSB) associated with a BS 110, means for generating a security key associated with a handover of the UE 120 based at least in part on the frequency associated with the SSB, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, BS 110 may include means for transmitting, to a UE 120, a handover command that identifies a plurality of frequencies, means for generating a security key, associated with a handover of the UE 120, based at least in part on a frequency of the plurality of frequencies, wherein the frequency is associated with an SSB associated with the BS 110, and/or the like. In some aspects, BS 110 may include means for identifying a frequency associated with an SSB associated with a UE 120, means for transmitting, to another BS 110, a communication that identifies the frequency associated with the SSB, wherein the frequency associated with the SSB is included in a plurality of frequencies identified in the communication, and wherein the frequency associated with the SSB is identified, in the communication, as an ARFCN for purposes of generating a security key associated with the UE 120, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

A wireless communication device (e.g., BS, a UE, and/or the like) may generate various security keys, which may be used to secure communications transmitted in connection with a handover procedure (e.g., a handover of a UE from a first BS to a second BS), a radio resource control (RRC) resume procedure (e.g., a procedure in which a UE transitions from an idle mode or an inactive mode to a connected mode), an RRC reestablishment procedure (e.g., a procedure in which a UE attempts to reestablish a connection with a BS as a result of a radio link failure, a handover failure, and/or another type of connection failure), and/or the like.

In some cases, a wireless communication (e.g., BS, a UE, and/or the like) device may generate a radio access network security key (e.g., a $K_{NG-RAN}^*$) using a key derivation function as part of vertical key derivation, horizontal key derivation, and/or the like. In some cases, the wireless communication device may use various parameters in the key derivation function, such as a BS security key (e.g., $K_{gNG}$) associated with a BS, a physical cell identifier (PCI) associated with the BS, an ARFCN associated with a downlink channel of the BS, and/or the like.

While the BS security key and the PCI associated with the BS may be easily identifiable by the wireless communication device, which frequency corresponds to the ARFCN of a downlink channel may be ambiguous and/or difficult to determine. For example, in LTE, the center frequency of a downlink channel may be used as the ARFCN of the downlink channel. However, in a 5G/NR wireless network, a downlink channel may be split into various bandwidth parts. The downlink channel may include a plurality of SS blocks (SSBs) at various frequencies within the downlink channel, and frequencies may be flexibly assigned to the plurality of SSBs. As a result, the wireless communication device may be unable to determine which frequency in the downlink channel to use as the ARFCN of the downlink channel in a key derivation function for generating $K_{NG-RAN}^*$ and/or other security keys, which may result in multiple wireless communication devices (e.g., a UE and a BS) generating $K_{NG-RAN}^*$ and/or other security keys that do not match.

Some aspects described herein provide techniques and apparatuses for identifying an ARFCN for security key generation. In some aspects, a UE and a BS may use a frequency associated with an SSB, of a downlink channel used between the UE and the BS, as an ARFCN for purposes of generating a $K_{NG-RAN}^*$ (and/or other security keys) associated with the UE and the BS. In this way, the UE and the BS use the same ARFCN when generating a $K_{NG-RAN}^*$, which ensures that the $K_{NG-RAN}^*$ generated by the UE and the $K_{NG-RAN}^*$ generated by the BS match.

In cases where the downlink channel is configured with a plurality of SSBs (e.g., each with a different frequency), an SSB of the plurality of SSBs may be selected as the ARFCN for the downlink channel (e.g., by the UE, by the BS, by another BS, and/or the like). If the $K_{NG-RAN}^*$ is to be generated as part of an RRC resume procedure, an RRC reestablishment procedure, a handover procedure, and/or the like, a target BS may transmit an indication of the frequency of the selected SSB to the source BS, and may indicate to the source BS that the frequency of the selected SSB is to be used as the ARFCN of the downlink channel for purposes of generating the $K_{NG-RAN}^*$. Accordingly, the source BS may generate the $K_{NG-RAN}^*$ based at least in part on the indication that the frequency of the selected SSB is to be used as the ARFCN.

Figure 3A:
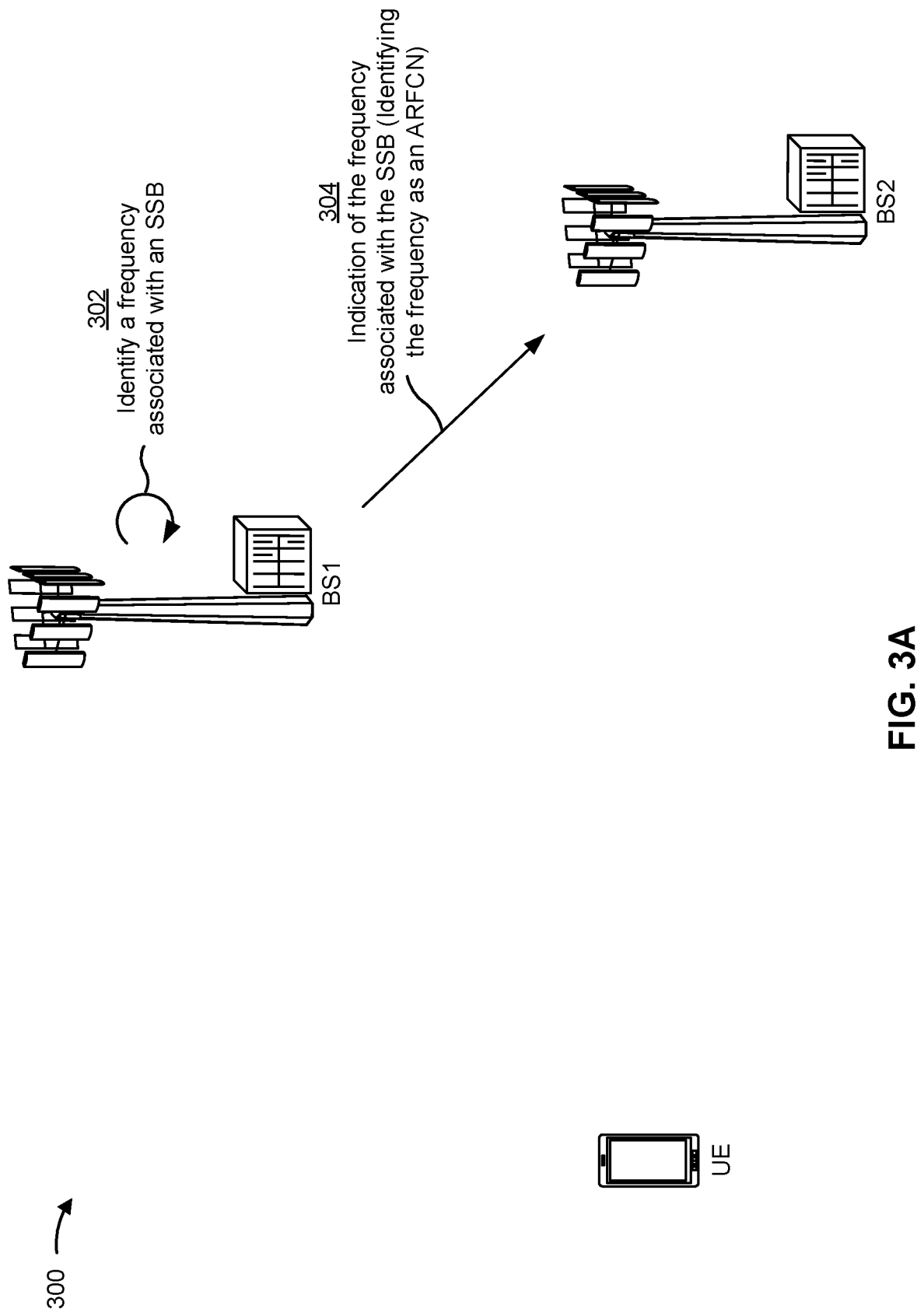
FIGS. 3A and 3B are diagrams illustrating one or more examples of identifying an absolute radio frequency channel number for security key generation, in accordance with various aspects of the present disclosure.
Figure 3B:
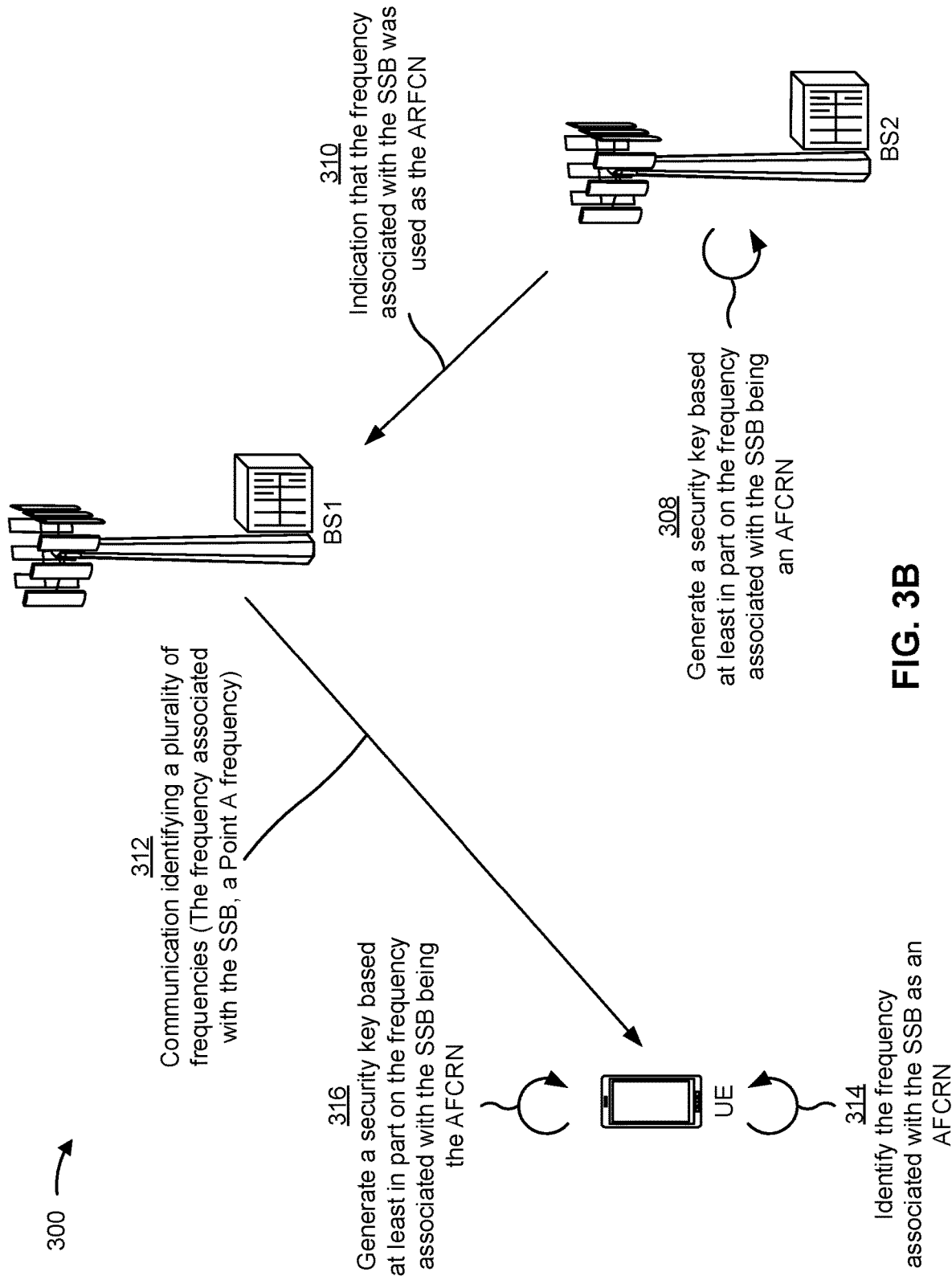

FIGS. 3A and 3B are diagrams illustrating one or more examples 300 of identifying an ARFCN for security key generation, in accordance with various aspects of the present disclosure. As shown in FIGS. 3A and 3B, example(s) 300 may include communication between a UE (e.g., UE 120) and one or more BSs (e.g., BS 110), such as BS1, BS2, and/or the like. In some aspects, the UE and the one or more BSs may be included in a wireless network, such as wireless network 100 and/or another wireless network.

In some aspects, the UE and BS2 may generate various security keys, which may be used to secure communication between the UE, BS1, BS2, and/or other wireless communication devices in the wireless network. For example, the UE and BS2 may generate a radio access network security key (e.g., a $K_{NG-RAN}^*$) using a key derivation function as part of vertical key derivation, horizontal key derivation, and/or the like. In some aspects, the UE and BS2 may generate $K_{NG-RAN}^*$ as part of a handover procedure (e.g., a handover of the UE from BS2 to BS1), an RRC resume procedure (e.g., where the UE transitions from an idle mode or inactive mode to a connected mode, where the UE was anchored on BS2 and resumes on BS1), an RRC reestablishment procedure (e.g., where the UE attempts to reestablish a connection to the wireless network by connecting to BS1), and/or the like. In some cases, the UE and BS2 may use various parameters in the key derivation function, such as a BS security key (e.g., $K_{gNB}$) associated with BS2, a PCI associated with BS1, an ARFCN associated with a downlink channel of BS1, and/or the like.

As shown in FIG. 3A, and by reference number 302, BS1 may identify a frequency associated with an SSB. The SSB may be an SSB that BS1 transmits on a downlink channel, and may be included in a plurality of SSBs that BS1 transmits on the downlink channel. In some aspects, the SSB may be a cell defining SSB (CD-SSB) or another SSB of the downlink channel.

In some aspects, BS1 may identify the frequency associated with the SSB based at least in part on receiving, from the UE, an indication of the frequency associated with the SSB. The SSB may be associated with the UE in that the UE selects the SSB for purposes of resuming a connection with the wireless network. For example, the UE may measure the SSB and other SSBs transmitted on the downlink channel as part of an RRC resume procedure, may select the SSB and the bandwidth part associated with the SSB, and may transmit an indication of the SSB to BS1. The UE may transmit the indication of the SSB to BS1 in a random access channel (RACH) communication, such as a message 1 (Msg1) communication in a four-step RACH procedure, a message A (MsgA) communication in a two-step RACH procedure, and/or the like. BS1 may receive the indication of the SSB from the UE and may identify the frequency associated with the SSB.

As further shown in FIG. 3A, and by reference number 304, BS1 may transmit an indication of the frequency associated with the SSB to BS2. In some aspects, BS1 may transmit the indication of the frequency associated with the SSB in a communication along with an indication of one or more other SSBs and associated frequencies. In this case, the communication may implicitly or explicitly indicate that the frequency associated with the SSB is to be used as an ARFCN for purposes of generating a security key (e.g., a $K_{NG-RAN}^*$) associated with the UE and BS2.

In some aspects, the indication that the frequency associated with the SSB is to be used as the ARFCN for purposes of generating the security key associated with the UE and BS2 may be explicitly or implicitly indicated in a MeasurementTimingConfiguration information element (IE) included in the communication. For example, the indication that the frequency associated with the SSB is to be used as the ARFCN for purposes of generating the security key associated with the UE and BS2 may be explicitly indicated in an ARFCN IE in the MeasurementTimingConfiguration IE.

As another example, the indication that the frequency associated with the SSB is to be used as an ARFCN for purposes of generating a security key associated with the UE and BS2 may be implicitly indicated in the MeasurementTimingConfiguration IE based at least in part on an order of the SSBs and associated frequencies listed in the MeasurementTimingConfiguration IE. In this case, the first SSB and associated frequency, listed first in the list of SSBs and associated frequencies, may be used as the ARFCN for purposes of generating the security key associated with the UE and BS2. Other particular locations in the list of SSBs and associated frequencies may be used to implicitly indicate that a frequency associated with an SSB is to be used as the ARFCN for purposes of generating the security key associated with the UE and BS2.

In some aspects, if the security key is to be generated as part of a handover procedure associated with the UE, the communication may include Xn access protocol (XnAP) handover request communication transmitted from BS1 to BS2 via an Xn interface, an X2 interface, and/or another backhaul interface. In this case, the frequency associated with the SSB may be explicitly indicated in an ARFCN IE included in an access stratum (AS) security information IE of the XnAP handover request communication.

In some aspects, if the security key is to be generated as part of an RRC resume procedure associated with the UE, the communication may include a retrieve UE context request communication. The retrieve UE context request communication may include a request for BS2 to provide a UE context associated with the UE so that the connection of the UE with the wireless network may be resumed based at least in part on the UE context. In some aspects, BS2 may store the UE context based at least in part on the UE being anchored on BS2 and transitioning to an idle mode or inactive mode. In this case, the frequency associated with the SSB may be explicitly indicated in an ARFCN IE included in the retrieve UE context request communication.

As shown in FIG. 3B, and by reference number 308, BS2 may generate the security key associated with the UE and BS2 based at least in part on the frequency associated with the SSB being an ARFCN for purposes of generating the security key. For example, BS2 may receive the communication from BS1, may determine, based at least in part on the communication, that the frequency associated with the SSB is to be used as the ARFCN to generate the security key associated with the UE and BS2, and may generate the security key associated with the UE and BS2 based at least in part on the frequency associated with the SSB being the ARFCN.

In some aspects, BS2 may generate the security key by using the ARFCN in a key derivation function. In some aspects, BS2 may generate the security key by using the PCI associated with BS2 and/or other parameters in the key derivation function.

As further shown in FIG. 3B, and by reference number 310, BS2 may transmit, to BS1, an indication that the frequency associated with the SSB was used as the ARFCN for purposes of generating the security key associated with the UE and BS2. For example, BS2 may transmit a handover preparation information communication that includes, in RRC reestablishment information associated with the UE, the indication that the frequency associated with the SSB was used as the ARFCN. In some aspects, the RRC reestablishment information may be used to reduce RRC reestablishment delay in case of a handover failure associated with the UE. In some aspects, the indication that the frequency associated with the SSB was used as the ARFCN may be explicitly indicated in an ARFCN IE included in a ReestabNCellInfo IE of the handover preparation information communication. The ReestabNCellInfo IE may be included in a ReestablishmentInfo IE of an AS context IE included in the handover preparation information communication.

In some aspects, BS2 may further transmit an indication of the security key generated basted at least in part on the frequency associated with the SSB. In some aspects, if BS1 has a plurality of SSBs in frequency domain (e.g., an SSB frequency per bandwidth part (BWP) configured for BS1), BS2 may not know which SSB/BWP combination will be selected by BS1 for the UE. In this case, BS2 may indicate a plurality of $\{K_{NG-RAN}^*, \text{ARFCN}\}$ sets (e.g., one set per SSB/BWP) to BS1. In some aspects, if BS1 selects an SSB/BWP combination which is different from the plurality of indicated $\{K_{NG-RAN}^*, \text{ARFCN}\}$ sets, or not included in the plurality of indicated $\{K_{NG-RAN}^*, \text{ARFCN}\}$ sets, BS1 may reject the handover request.

As further shown in FIG. 3B, and by reference number 312, BS1 may transmit, to the UE, a communication identifying a plurality of frequencies. In some aspects, BS1 may transmit the communication to the UE as part of a RACH procedure (e.g., a message 2 (Msg2) communication, a message 4 (Msg4) communication, a message B (MsgB) communication, and/or the like), as part of a handover procedure, as part of an RRC resume procedure, as part of an RRC reestablishment procedure, and/or the like.

In some aspects, the plurality of frequencies may include the frequency of the SSB, may include a "Point A" frequency (e.g., which may be a frequency corresponding to the first physical resource block, in the frequency domain, of the downlink channel associated with BS1), and/or other frequencies.

As further shown in FIG. 3B, and by reference number 314, the UE may identify the frequency of the SSB, indicated in the communication, as an ARFCN of the downlink channel for purposes of generating a security key (e.g., a $K_{NG-RAN}^*$) associated with the UE and BS2. For example, the UE may be configured to identify the frequency of the SSB, from the other frequencies indicated in the communication received from BS1, as the ARFCN.

As further shown in FIG. 3B, and by reference number 316, the UE may generate the security key based at least in part on the frequency associated with the SSB being the ARFCN for purposes of generating the security key. For example, the UE may generate the security key by using the ARFCN in a key derivation function. In some aspects, the UE may generate the security key by using the PCI associated with BS2 and/or other parameters in the key derivation function.

In this way, the UE and BS2 may use a frequency associated with an SSB, of a downlink channel used between the UE and BS1, as an ARFCN for purposes of generating a $K_{NG-RAN}*$ (and/or other security keys) associated with the UE and BS2. In this way, the UE and BS2 may use the same ARFCN when generating a $K_{NG-RAN}*$, which ensures that the $K_{NG-RAN}*$ generated by the UE and the $K_{NG-RAN}*$ generated by BS2 match.

As indicated above, FIGS. 3A and 3B are provided as one or more examples. Other examples may differ from what is described with respect to FIGS. 3A and 3B.

Figure 4:
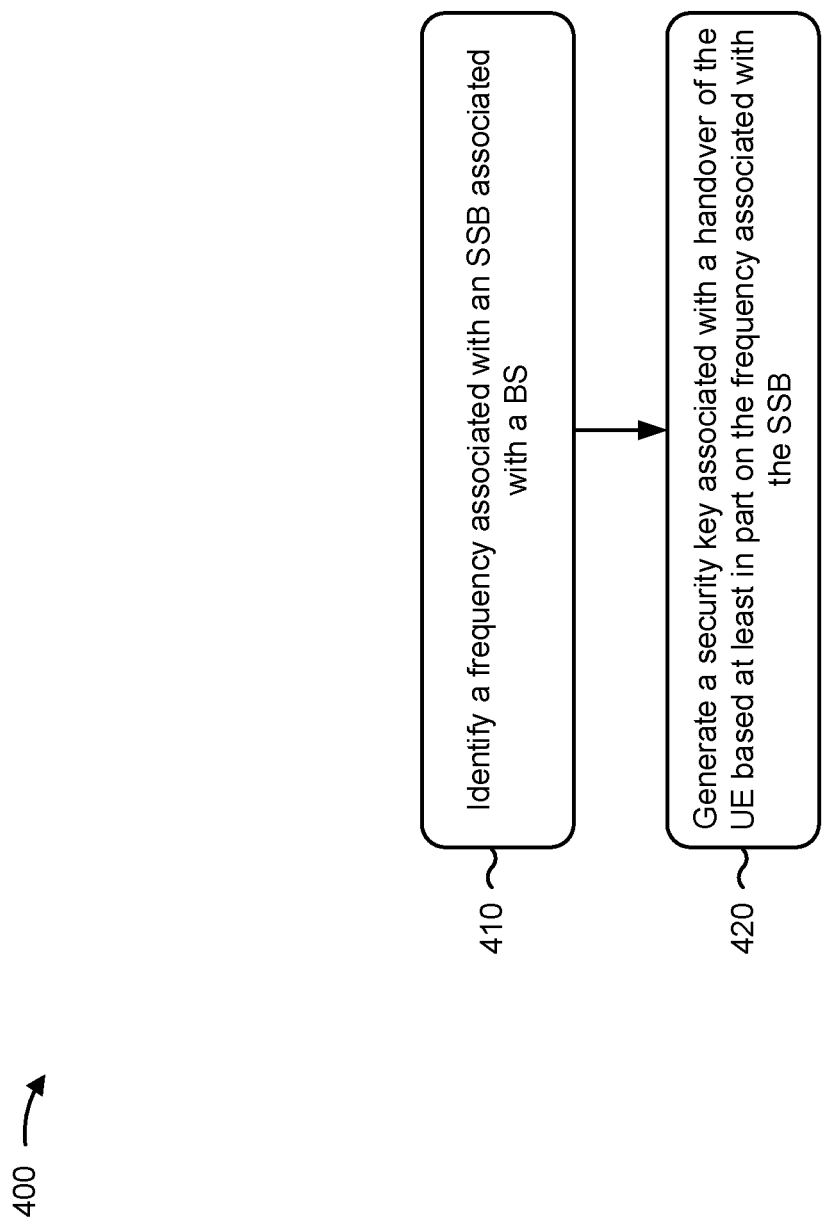
FIG. 4 is a diagram illustrating an example process performed, for example, by a UE, in accordance with various aspects of the present disclosure.

FIG. 4 is a diagram illustrating an example process 400 performed, for example, by a UE, in accordance with various aspects of the present disclosure. Example process 400 is an example where the UE (e.g., UE 120) performs operations associated with identifying an ARFCN for security key generation.

As shown in FIG. 4, in some aspects, process 400 may include identifying a frequency associated with an SSB associated with the BS (block 410). For example, the UE (e.g., using receive processor 258, transmit processor 264, controller/processor 280, memory 282, and/or the like) may identify a frequency associated with an SSB associated with the BS, as described above.

As further shown in FIG. 4, in some aspects, process 400 may include generating a security key associated with a handover of the UE based at least in part on the frequency associated with the SSB (block 420). For example, the UE (e.g., using receive processor 258, transmit processor 264, controller/processor 280, memory 282, and/or the like) may generate a security key associated with a handover of the UE based at least in part on the frequency associated with the SSB, as described above.

Process 400 may include additional aspects, such as any single aspect or any combination of aspects described below and/or in connection with one or more other processes described elsewhere herein.

In a first aspect, generating the security key comprises generating the security key based at least in part on a key derivation function, wherein the frequency associated with the SSB is used as an ARFCN in the key derivation function and wherein the security key comprises a $K_{NG-RAN}*$ security key. In a second aspect, alone or in combination with the first aspect, identifying the frequency associated with the SSB comprises identifying, in the handover command, the frequency associated with the SSB from a plurality of frequencies identified in the handover command.

In a third aspect, alone or in combination with the first or second aspects, identifying the frequency associated with the SSB comprises identifying the frequency associated with the SSB based at least in part on selecting the SSB for an RRC resume procedure. In a fourth aspect, alone or in combination with the first through third aspects, identifying the frequency associated with the SSB comprises identifying the frequency associated with the SSB based at least in part on selecting the SSB for an RRC resume procedure. In a fifth aspect, along or in combination with the one or more through of the first through fourth aspects, the SSB is a CD-SSB.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
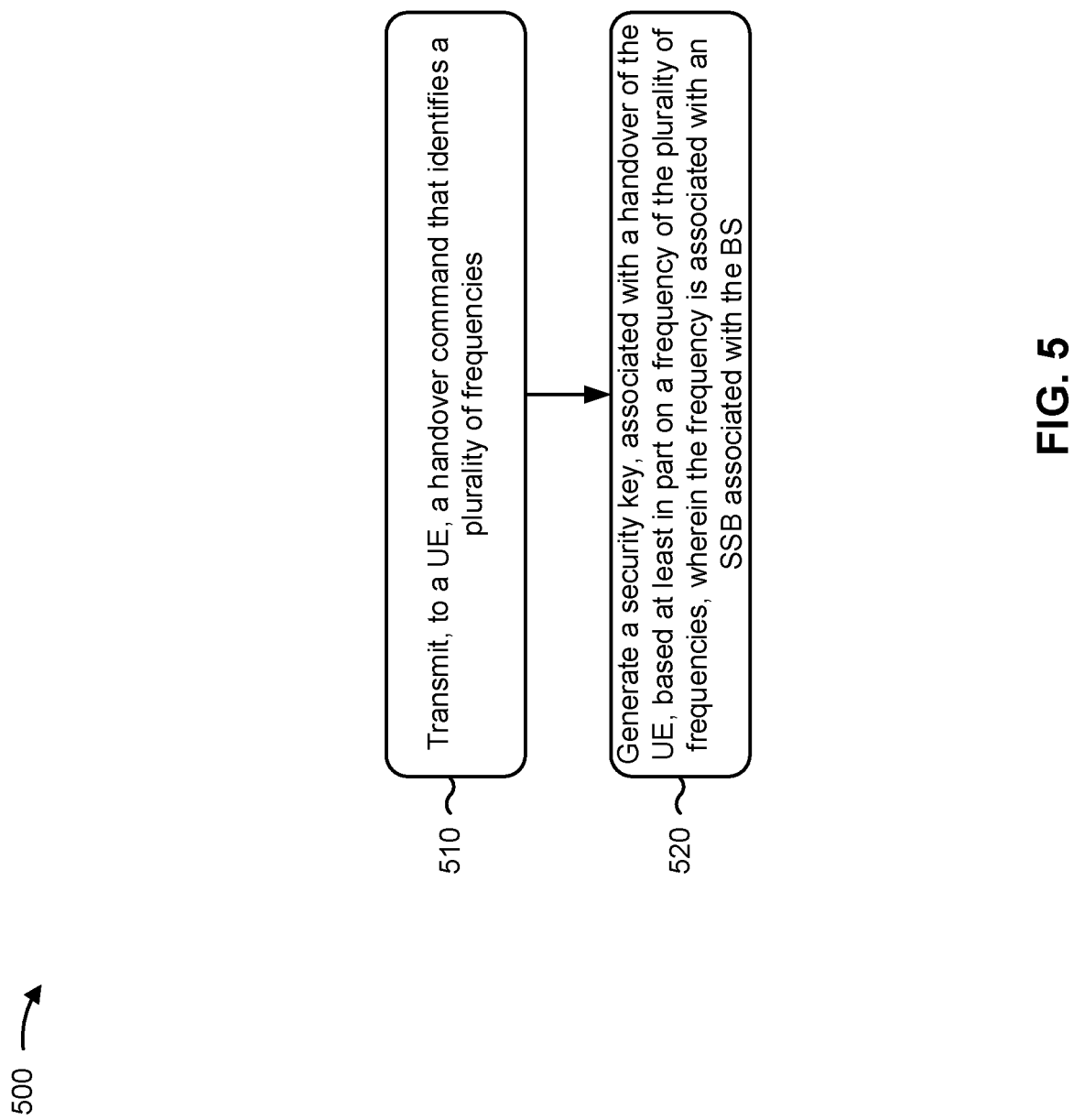
FIGS. 5 and 6 are diagrams illustrating example processes performed, for example, by a BS, in accordance with various aspects of the present disclosure.

FIG. 5 is a diagram illustrating an example process 500 performed, for example, by a BS, in accordance with various aspects of the present disclosure. Example process 500 is an example where the BS (e.g., BS 110) performs operations associated with identifying an ARFCN for security key generation.

As shown in FIG. 5, in some aspects, process 500 may include transmitting, to a UE, a handover command that identifies a plurality of frequencies (block 510). For example, the BS (e.g., using transmit processor 220, receive processor 238, controller/processor 240, memory 242, and/or the like) may transmit, to a UE, a handover command that identifies a plurality of frequencies, as described above.

As further shown in FIG. 5, in some aspects, process 500 may include generating a security key, associated with a handover of the UE, based at least in part on a frequency of the plurality of frequencies, wherein the frequency is associated with an SSB associated with the BS (block 520). For example, the BS (e.g., using transmit processor 220, receive processor 238, controller/processor 240, memory 242, and/or the like) may generate a security key, associated with a handover of the UE, based at least in part on a frequency of the plurality of frequencies, as described above. In some aspects, the frequency is associated with an SSB associated with the BS.

Process 500 may include additional aspects, such as any single aspect or any combination of aspects described below and/or in connection with one or more other processes described elsewhere herein.

In a first aspect, generating the security key comprises generating the security key based at least in part on a key derivation function, wherein the frequency associated with the SSB is used as an ARFCN in the key derivation function and wherein the security key comprises a $K_{NG-RAN}*$ security key. In a second aspect, along or in combination with the first aspect, the SSB is a CD-SSB.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
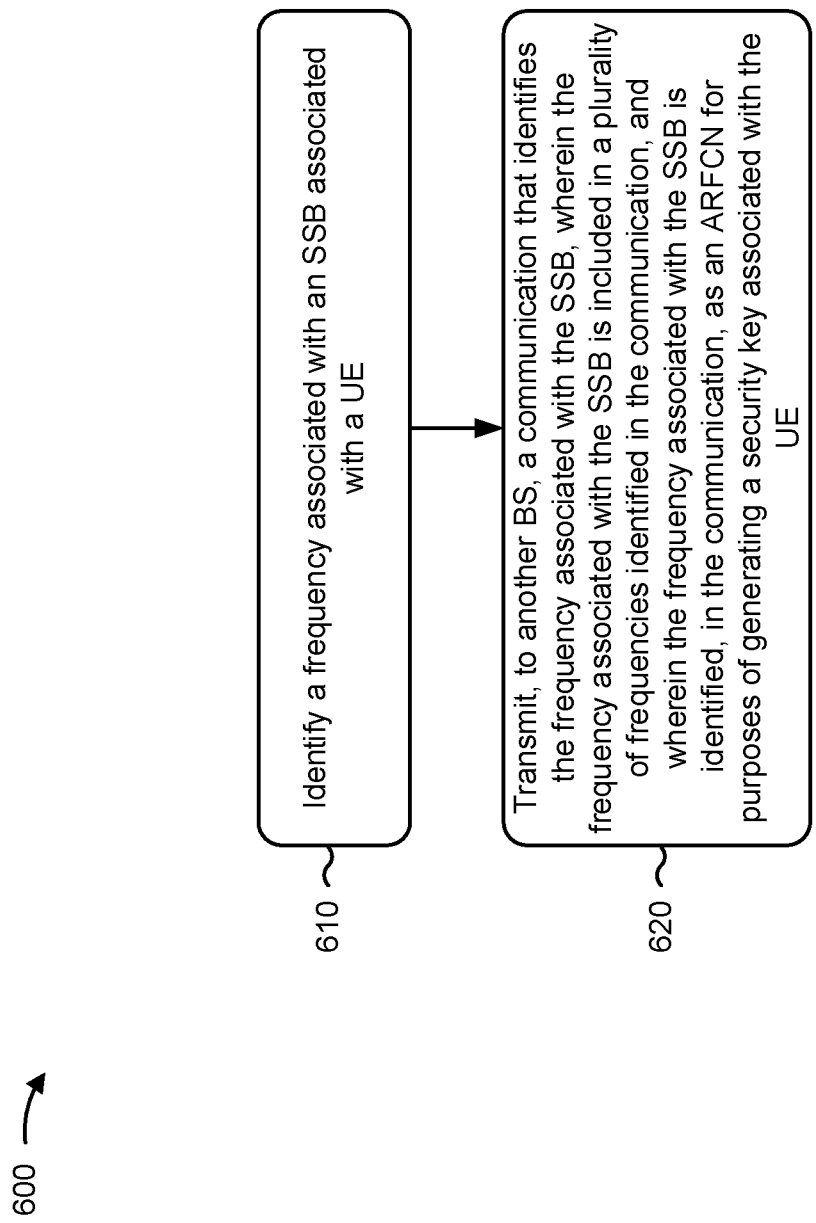

FIG. 6 is a diagram illustrating an example process 600 performed, for example, by a BS, in accordance with various aspects of the present disclosure. Example process 600 is an example where the BS (e.g., BS 110) performs operations associated with identifying an ARFCN for security key generation.

As shown in FIG. 6, in some aspects, process 600 may include identifying a frequency associated with an SSB associated with a UE (block 610). For example, the BS (e.g., using transmit processor 220, receive processor 238, controller/processor 240, memory 242, and/or the like) may identify a frequency associated with an SSB associated with a UE, as described above.

As further shown in FIG. 6, in some aspects, process 600 may include transmitting, to another BS, a communication that identifies the frequency associated with the SSB, wherein the frequency associated with the SSB is included in a plurality of frequencies identified in the communication, and wherein the frequency associated with the SSB is identified, in the communication, as an ARFCN for purposes of generating a security key associated with the UE (block 620). For example, the BS (e.g., using transmit processor 220, receive processor 238, controller/processor 240, memory 242, and/or the like) may transmit, to another BS, a communication that identifies the frequency associated with the SSB, as described above. In some aspects, the frequency associated with the SSB is included in a plurality of frequencies identified in the communication. In some aspects, the frequency associated with the SSB is identified, in the communication, as an ARFCN for purposes of generating a security key associated with the UE.

Process 600 may include additional aspects, such as any single aspect or any combination of aspects described below and/or in connection with one or more other processes described elsewhere herein.

In a first aspect, transmitting the communication that identifies the frequency associated with the SSB comprises transmitting the communication as part of a handover of the UE, wherein the communication comprises an XnAP handover request communication. In a second aspect, alone or in combination with the first aspect, the frequency associated with the SSB is explicitly indicated in an ARFCN IE included in an access stratum IE of the XnAP handover request communication.

In a third aspect, alone or in combination with one or more of the first and second aspects, transmitting the communication that identifies the frequency associated with the SSB comprises transmitting the communication as part of an RRC resume procedure associated with the UE, wherein the communication comprises a retrieve UE context request communication. In a fourth aspect, alone or in combination with one or more of the first through third aspects, the frequency associated with the SSB is explicitly indicated in an ARFCN IE included in the retrieve UE context request communication.

In a fifth aspect, alone or in combination with one or more of the first through fourth aspects, transmitting the communication that identifies the frequency associated with the SSB comprises transmitting the communication as part of a handover associated with the UE, wherein the communication comprises a handover preparation information communication. In a sixth aspect, alone or in combination with one or more of the first through fifth aspects, the frequency associated with the SSB is explicitly indicated in an ARFCN IE included in a ReestabNCellInfo IE of the handover preparation information communication.

In a seventh aspect, alone or in combination with one or more of the first through sixth aspects, the frequency associated with the SSB is identified in the communication as the ARFCN for purposes of generating a security key associated with the UE based at least in part on an order of the plurality of frequencies in a MeasurementTimingConfiguration IE in the communication. In an eighth aspect, alone or in combination with one or more of the first through seventh aspects, the frequency associated with the SSB is identified in the communication as the ARFCN for purposes of generating a security key associated with the UE based at least in part on being a frequency of a first SSB or an SSB specified by the BS, of a plurality of SSBs listed in an MeasurementTimingConfiguration IE in the communication. In a ninth aspect, alone or in combination with one or more of the first through eighth aspects, transmitting the communication that identifies the frequency associated with the SSB comprises transmitting the communication via an Xn interface. In a tenth aspect, along or in combination with the one or more through of the first through ninth aspects, the SSB is a CD-SSB.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
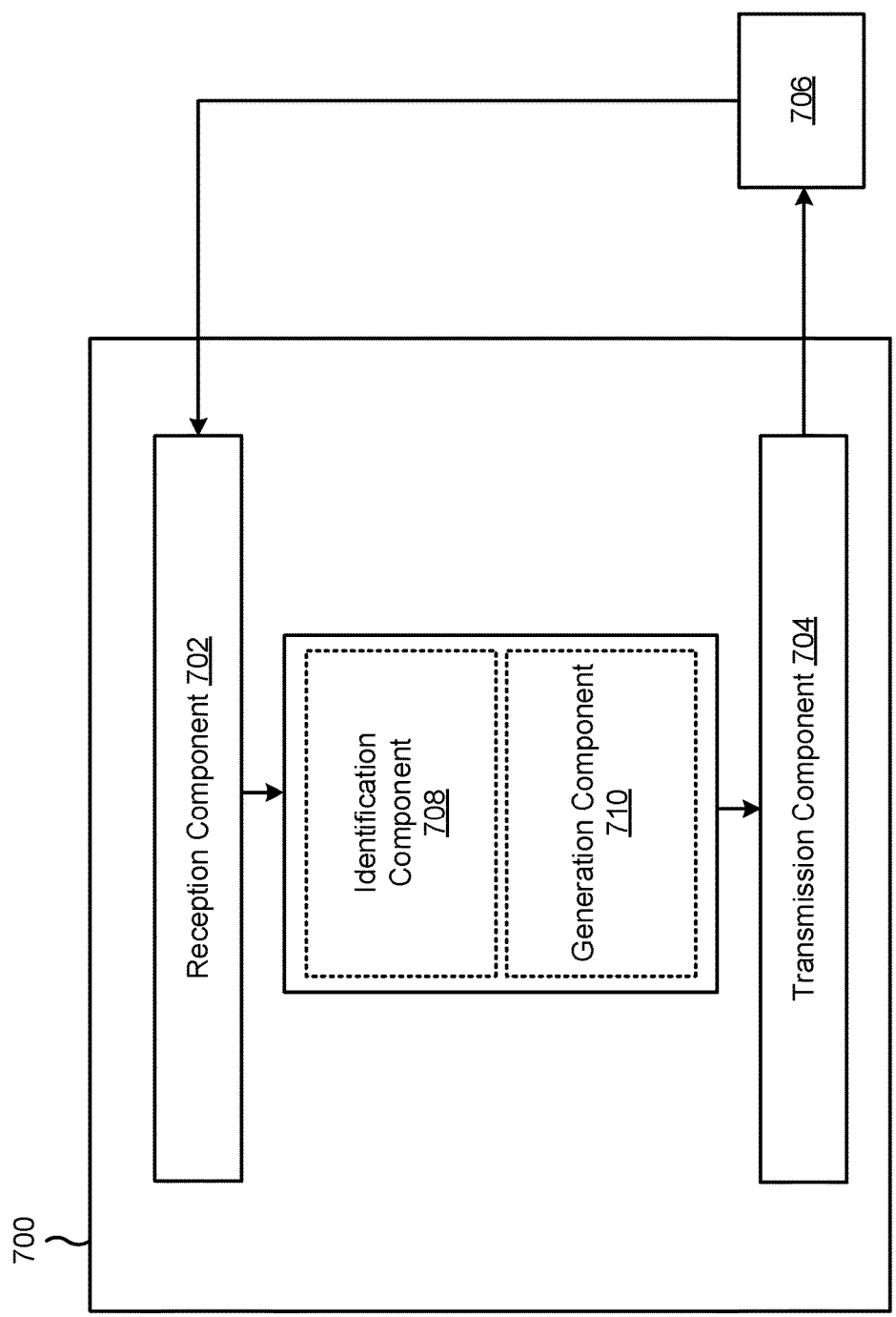
FIGS. 7-9 are block diagrams of example apparatuses for wireless communication, in accordance with various aspects of the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include one or more of an identification component 708 and a generation component 710, among other examples.

In some aspects, the apparatus 700 may be configured to perform one or more operations described herein in connection with FIGS. 3A and 3B. Additionally, or alternatively, the apparatus 700 may be configured to perform one or more processes described herein, such as process 400 of FIG. 4. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be collocated with the reception component 702 in a transceiver.

The identification component 708 may identify a frequency associated with an SSB associated with the apparatus 706. In some aspects, the identification component 708 may include a receive processor, a transmit processor, a controller/processor, a memory, or a combination thereof, of the UE described above in connection with FIG. 2. The generation component 710 may generate a security key associated with a handover of the UE based at least in part on the frequency associated with the SSB. In some aspects, the generation component 710 may include a receive processor, a transmit processor, a controller/processor, a memory, or a combination thereof, of the UE described above in connection with FIG. 2.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
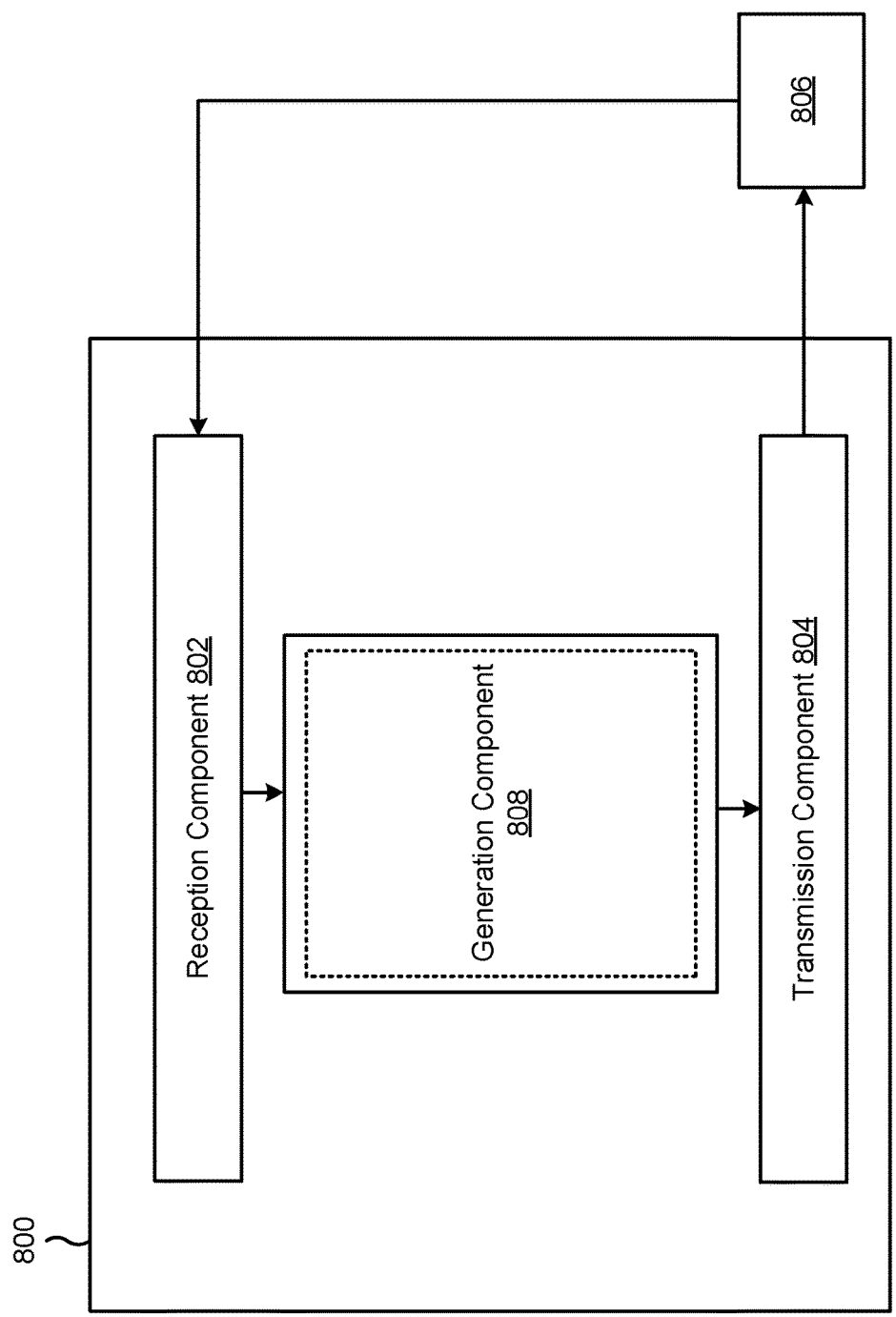

FIG. 8 is a block diagram of an example apparatus 800 for wireless communication. The apparatus 800 may be a BS, or a BS may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a generation component 808.

In some aspects, the apparatus 800 may be configured to perform one or more operations described herein in connection with FIGS. 3A and 3B. Additionally, or alternatively, the apparatus 800 may be configured to perform one or more processes described herein, such as process 500 of FIG. 5. In some aspects, the apparatus 800 and/or one or more components shown in FIG. 8 may include one or more components of the BS described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the BS described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the BS described above in connection with FIG. 2. In some aspects, the transmission component 804 may be collocated with the reception component 802 in a transceiver.

The transmission component 804 may transmit, to the apparatus 806, a handover command that identifies a plurality of frequencies. The generation component 808 may generate a security key, associated with a handover of the apparatus 806, based at least in part on a frequency of the plurality of frequencies wherein the frequency is associated with an SSB associated with. In some aspects, the generation component 808 may include one or more antennas, a demodulator, a MIMO detector, a receive processor, a modulator, a transmit MIMO processor, a transmit processor, a controller/processor, a memory, or a combination thereof, of the BS described above in connection with FIG. 2.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
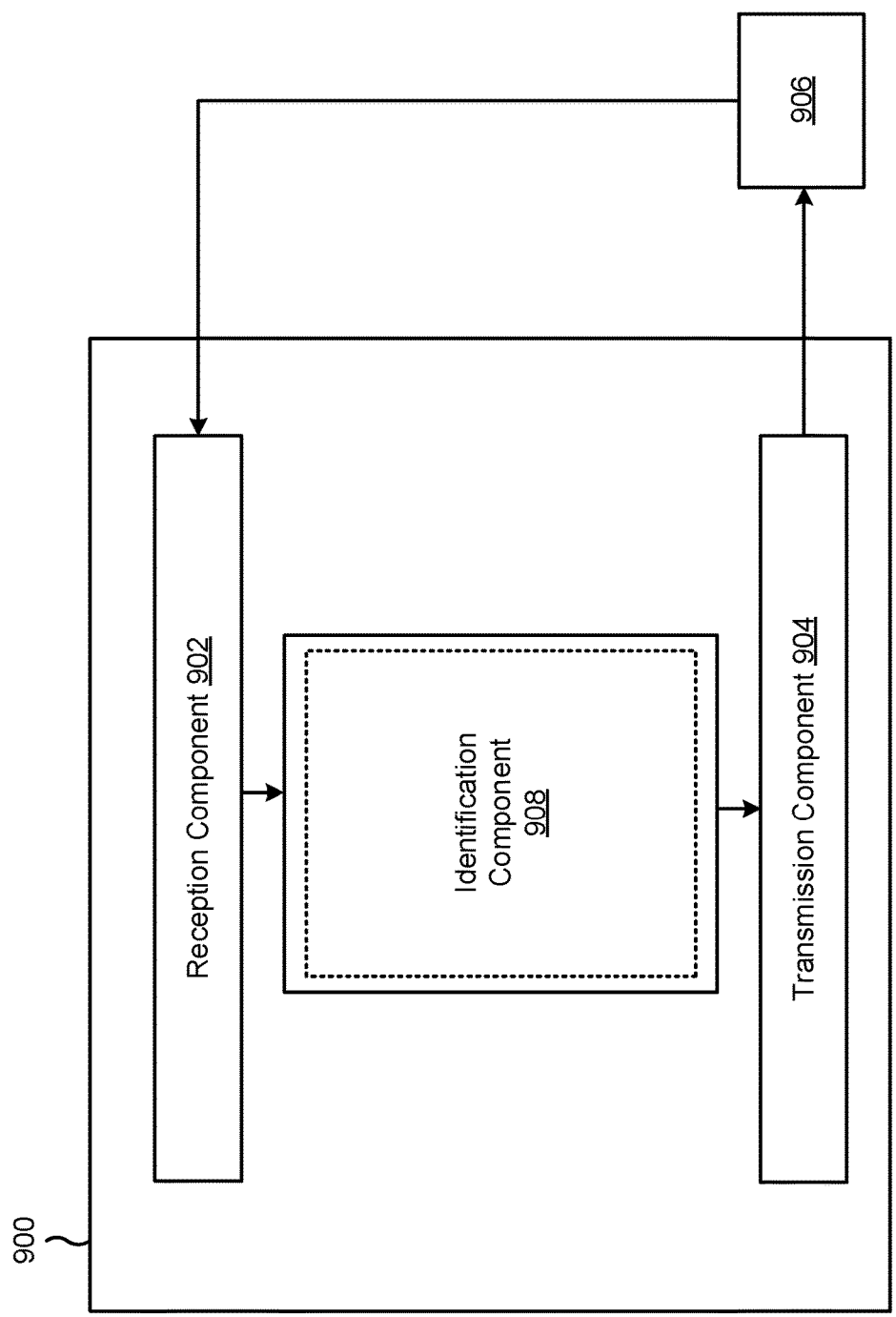

FIG. 9 is a block diagram of an example apparatus 900 for wireless communication. The apparatus 900 may be a BS, or a BS may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include one or more of an identification component 908.

In some aspects, the apparatus 900 may be configured to perform one or more operations described herein in connection with FIGS. 3A and 3B. Additionally, or alternatively, the apparatus 900 may be configured to perform one or more processes described herein, such as process 600 of FIG. 6. In some aspects, the apparatus 900 and/or one or more components shown in FIG. 9 may include one or more components of the BS described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the BS described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the BS described above in connection with FIG. 2. In some aspects, the transmission component 904 may be collocated with the reception component 902 in a transceiver.

The identification component 908 may identify a frequency associated with an SSB associated with a UE. In some aspects, the identification component 908 may include a receive processor, a transmit processor, a controller/processor, a memory, or a combination thereof, of the BS described above in connection with FIG. 2. The transmission component 904 may transmit, to the apparatus 906, a communication that identifies the frequency associated with the SSB wherein the frequency associated with the SSB is included in a plurality of frequencies identified in the communication, and wherein the frequency associated with the SSB is identified, in the communication, as an ARFCN for purposes of generating a security key associated with the UE.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving, from a network entity, a communication, identifying a plurality of frequencies, on a downlink channel, wherein the communication indicates a particular frequency, of the plurality of frequencies and associated with a synchronization signal block (SSB) associated with the network entity, as an absolute radio frequency channel number (ARFCN) of the downlink channel;
   identifying, based at least in part on receiving the communication, the particular frequency, of the plurality of frequencies and associated with the SSB, as the ARFCN of the downlink channel; and
   generating a security key associated with a handover of the UE based at least in part on the particular frequency associated with the SSB.

2. The method of claim 1, wherein generating the security key comprises:
   generating the security key based at least in part on a key derivation function,
      wherein the particular frequency associated with the SSB is used as the ARFCN in the key derivation function; and
      wherein the security key comprises a $K_{NG-RAN}$* security key.

3. The method of claim 1, wherein the communication comprises a handover command received from the network entity.

4. The method of claim 1, wherein receiving the communication comprises:
   receiving the communication based at least in part on selecting the SSB for a radio resource control (RRC) resume procedure.

5. The method of claim 1, wherein receiving the communication comprises:
   receiving the communication based at least in part on selecting the SSB for a radio resource control (RRC) reestablishment procedure.

6. The method of claim 1, wherein the SSB is a cell defining SSB (CD-SSB).

7. A method of wireless communication performed by a network entity, comprising:
   receiving, from another network entity, an indication of a frequency, associated with a synchronization signal block (SSB); and
   generating a security key based at least in part on the frequency; and transmitting, to the other network entity, an indication that the frequency, associated with the SSB, was used for purposes of generating a security key associated with a handover of a user equipment.

8. The method of claim 7, wherein generating the security key comprises:
   generating the security key based at least in part on a key derivation function,
      wherein the frequency associated with the SSB is used as an absolute radio frequency channel number (ARFCN) in the key derivation function; and
      wherein the security key comprises a $K_{NG-RAN}$* security key.

9. The method of claim 7, wherein the SSB is a cell defining SSB (CD-SSB).

10. A method of wireless communication performed by a network entity, comprising:
    identifying a frequency associated with a synchronization signal block (SSB) associated with a user equipment (UE);
    transmitting, to another network entity, a communication identifying the frequency associated with the SSB as an absolute radio frequency channel number (ARFCN) for purposes of generating a security key associated with the UE; and
    receiving, based at least in part on transmitting the communication and from the other network entity, an indication that the frequency associated with the SSB was used as the ARFCN for purposes of generating a security key associated with the user equipment and the other network entity.

11. The method of claim 10, wherein transmitting the communication that identifies the frequency associated with the SSB comprises:
    transmitting the communication as part of a handover of the UE,
       wherein the communication comprises:
          an Xn access protocol (XnAP) handover request communication.

12. The method of claim 11, wherein the frequency associated with the SSB is explicitly indicated in an ARFCN information element (IE) included in an access stratum IE of the XnAP handover request communication.

13. The method of claim 10, wherein transmitting the communication that identifies the frequency associated with the SSB comprises:
    transmitting the communication as part of a radio resource control (RRC) resume procedure associated with the UE,
       wherein the communication comprises:
          a retrieve UE context request communication.

14. The method of claim 13, wherein the frequency associated with the SSB is explicitly indicated in an ARFCN information element (IE) included in the retrieve UE context request communication.

15. The method of claim 10, wherein transmitting the communication that identifies the frequency associated with the SSB comprises:
    transmitting the communication as part of a handover associated with the UE,
       wherein the communication comprises:
          a handover preparation information communication.

16. The method of claim 15, wherein the frequency associated with the SSB is explicitly indicated in an ARFCN information element (IE) included in a ReestabNCellInfo IE of the handover preparation information communication.

17. The method of claim 10, wherein the frequency associated with the SSB is identified in the communication as the ARFCN based at least in part on an order of a plurality of frequencies, including the frequency, in a MeasurementTimingConfiguration information element (IE) in the communication.

18. The method of claim 10, wherein the frequency associated with the SSB is identified in the communication as the ARFCN based at least in part on a plurality of SSBs, including the SSB, being listed in a MeasurementTimingConfiguration information element (IE) in the communication.

19. The method of claim 10, wherein the SSB is a cell defining SSB (CD-SSB).

20. A user equipment (UE) for wireless communication, comprising:
a memory; and
one or more processors coupled to the memory, the one or more processors configured to:
receive, from a network entity, a communication, identifying a plurality of frequencies, on a downlink channel, wherein the communication indicates a particular frequency, of the plurality of frequencies and associated with a synchronization signal block (SSB) associated with the network entity, as an absolute radio frequency channel number (ARFCN) of the downlink channel;
identify, based at least in part on receiving the communication, the particular frequency, of the plurality of frequencies and associated with the SSB, as the ARFCN of the downlink channel; and
generate a security key associated with a handover of the UE based at least in part on the particular frequency associated with the SSB.

21. The UE of claim 20, wherein the one or more processors, to generate the security key, are configured to:
generate the security key based at least in part on a key derivation function,
wherein the particular frequency associated with the SSB is used as the ARFCN in the key derivation function; and
wherein the security key comprises a $K_{NG-RAN}^*$ security key.

22. The UE of claim 20, wherein the communication comprises a handover command received from the network entity.

23. The UE of claim 20, wherein the one or more processors, to receive the communication, are configured to:
receive the communication based at least in part on selecting the SSB for a radio resource control (RRC) resume procedure.

24. The UE of claim 20, wherein the one or more processors, to receive the communication, are configured to:
receive the communication based at least in part on selecting the SSB for a radio resource control (RRC) reestablishment procedure.

25. The UE of claim 20, wherein the SSB is a cell defining SSB (CD-SSB).

26. A network entity for wireless communication, comprising:
a memory; and
one or more processors coupled to the memory, the memory and the one or more processors configured to:
receive, from another network entity, an indication of a frequency associated with a synchronization signal block (SSB);
generate the security key based at least in part on the frequency; and
transmit, to the other network entity, an indication that the frequency, associated with the SSB, was used for purposes of generating a security key associated with a handover of a user equipment.

27. The network entity of claim 26, wherein the one or more processors, to generate the security key, are configured to:
generate the security key based at least in part on a key derivation function,
wherein the frequency associated with the SSB is used as an absolute radio frequency channel number (ARFCN) in the key derivation function; and
wherein the security key comprises a $K_{NG-RAN}^*$ security key.

28. The network entity of claim 26, wherein the SSB is a cell defining SSB (CD-SSB).

29. A network entity for wireless communication, comprising:
a memory; and
one or more processors coupled to the memory, the one or more processors configured to:
identify a frequency associated with a synchronization signal block (SSB) associated with a user equipment (UE);
transmit, to another network entity, a communication identifying a frequency associated with the SSB as an absolute radio frequency channel number (ARFCN) for purposes of generating a security key associated with the UE; and
receive, based at least in part on transmitting the communication and from the other network entity, an indication that the frequency associated with the SSB was used as the ARFCN for purposes of generating a security key associated with the user equipment and the other network entity.

30. The network entity of claim 29, wherein the one or more processors, to transmit the communication that identifies the frequency associated with the SSB, are configured to:
transmit the communication as part of a handover of the UE,
wherein the communication comprises:
an Xn access protocol (XnAP) handover request communication.

31. The network entity of claim 30, wherein the frequency associated with the SSB is explicitly indicated in an ARFCN information element (IE) included in an access stratum IE of the XnAP handover request communication.

32. The network entity of claim 30, wherein the one or more processors, to transmit the communication that identifies the frequency associated with the SSB, are configured to:
transmit the communication as part of a radio resource control (RRC) resume procedure associated with the UE,
wherein the communication comprises:
a retrieve UE context request communication.

33. The network entity of claim 32, wherein the frequency associated with the SSB is explicitly indicated in an ARFCN information element (IE) included in the retrieve UE context request communication.

34. The network entity of claim 30, wherein the one or more processors, to transmit the communication that identifies the frequency associated with the SSB, are configured to:

transmit the communication as part of a handover associated with the UE,
wherein the communication comprises:
a handover preparation information communication.

35. The network entity of claim 34, wherein the frequency associated with the SSB is explicitly indicated in an ARFCN information element (IE) included in a ReestabNCellInfo IE of the handover preparation information communication.

* * * * *